Aug. 3, 1954 — J. J. DIETZ — 2,685,204
APPARATUS FOR MEASURING LOW GASEOUS PRESSURES
Filed May 16, 1950 — 2 Sheets-Sheet 1

INVENTOR
John J. Dietz
By Henry Lanahan
ATTORNEY

Aug. 3, 1954    J. J. DIETZ    2,685,204
APPARATUS FOR MEASURING LOW GASEOUS PRESSURES
Filed May 16, 1950    2 Sheets-Sheet 2
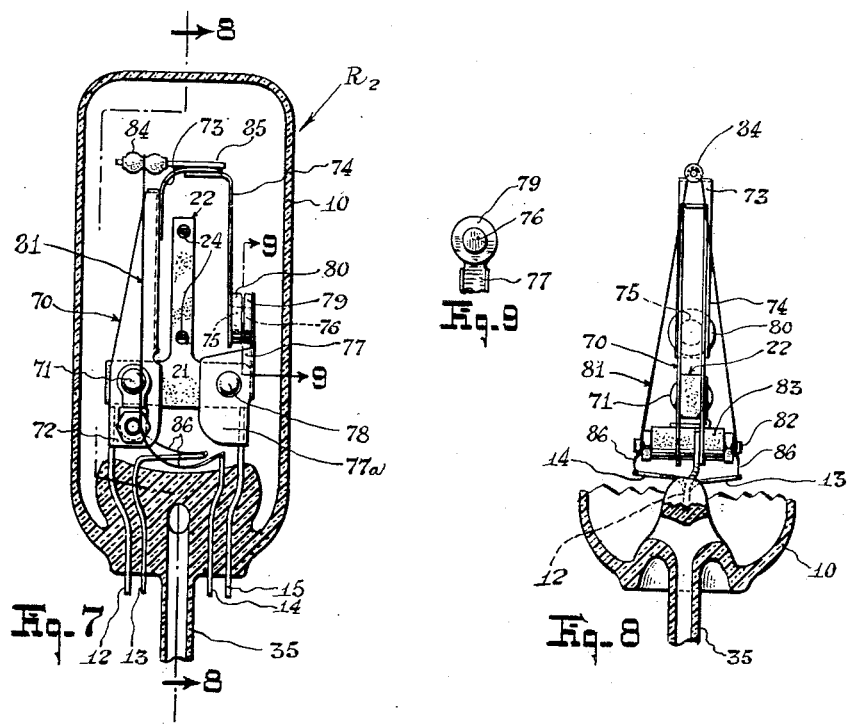
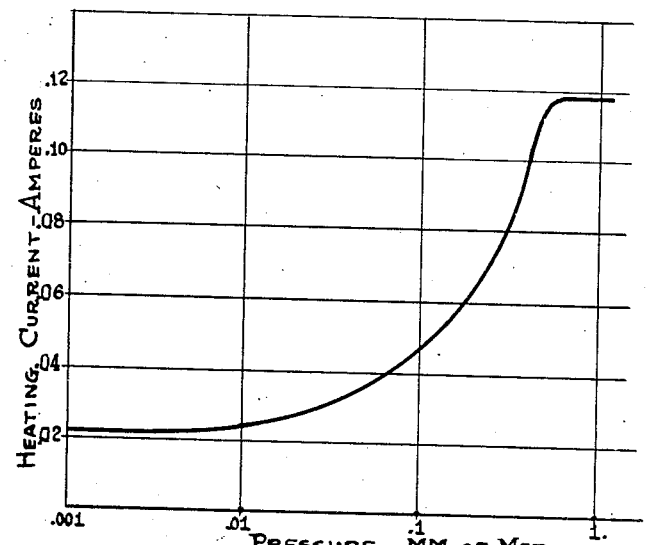
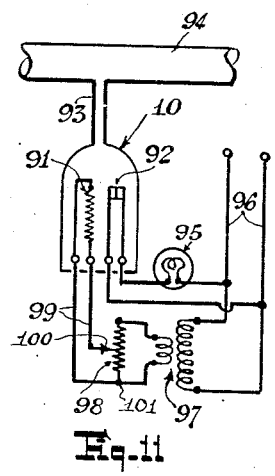
Inventor
John J. Dietz
Henry Lanahan
Attorney Patented Aug. 3, 1954

2,685,204

UNITED STATES PATENT OFFICE 2,685,204

APPARATUS FOR MEASURING LOW GASEOUS PRESSURES

John J. Dietz, New Milford, N. J., assignor to Thomas A. Edison, Incorporated, West Orange, N. J., a corporation of New Jersey Application May 16, 1950, Serial No. 162,200

6 Claims. (Cl. 73—399)

This invention relates to novel apparatus for detecting low gaseous pressures of the order of .0001 mm. of mercury as a minimum to 25 mm. of mercury as a maximum, the term "detecting" being herein utilized in a broad sense as comprehending measuring and/or controlling functions.

Objects of the invention are to provide simple and dependable devices and systems for detecting such low gaseous pressures.

A specific object of the invention is to provide a novel electrical switch or relay which is pressure-responsive at low gaseous pressures of the order mentioned.

A further object is to provide such an electrical switch device which is operable at a preselected threshold pressure and wherein the threshold pressure can be varied by control of an electric current.

A further object is to provide a novel automatic system for accurately measuring continuously low gaseous pressures of the order mentioned.

In a specific illustrative form of pressure-responsive device according to the present invention, a gas-tight casing adapted for connection to a source of pressure to be detected is provided with a switch operable by a thermally-expansible element which is heated by an electric current. This element has a heat-loss path through the gas medium in the casing, the thermal conductivity of which path falls sharply with decreasing pressure in the pressure range wherein the mean free length of path of the gas molecules is of the order of magnitude of the effective length of the gaseous path. As a result, for a given heating current, the temperature of the switch-operable element rises and falls with decreasing and increasing pressures within the pressure range above stated. Thus, switch operation occurs at a threshold pressure which is preselected by control of the heating current, the threshold pressure rising and falling as the heating current is increased and decreased. In an electrical system incorporating such pressure-responsive switch, the heating current is controlled automatically to maintain make and break operation of the swtich, and measurements of pressure are made continuously in terms of the heating current.

A prior-art device analogous in some respects to the present pressure-responsive device is the Pirani gauge. This gauge has a heated filament of a material having a high temperature coefficient of resistance. The filament is heated by a fixed current and is cooled by the residual gases under detection according to the pressure of those gases. However, in this gauge the varying electrical parameter is resistance. To measure or detect this variable parameter, there is required a Wheatstone bridge or equivalent circuit. The present device operates a pair of contacts to permit direct control of detecting and measuring circuits without the complication of such an intermediary system. For instance, in the useful application of the present device as a leak detector, an alarm or other suitable apparatus is controlled directly by the switch contacts of the device, as will appear. Thus, the present invention permits low pressure detection by means of apparatus of vastly simpler nature than that heretofore used. Because this apparatus is simpler, the pressure detection is made more reliably and accurately as will appear.

These and other objects and features of the invention will be apparent from the following description and the appended claims.

In the description of my invention reference is had to the accompanying drawings, of which:

Figure 1 is a view of one illustrative embodiment of a pressure-responsive switch or relay according to my invention, with parts shown in section on a plane through the axis of the switch;

Figures 2, 3 and 4 are detailed sectional views taken substantially on the lines 2—2, 3—3 and 4—4, respectively, of Figure 1;

Figure 7 is an elevational view, with the casing in section, of a second embodiment of pressure- and current-responsive switch device according to my invention;

Figure 8 is a fractional sectional view taken on the line 8—8 of Figure 7;

Figure 9 is a detailed fractional view taken on the line 9—9 of Figure 7;

Figure 10 is a graph illustrating the heating current-pressure characteristics of this second embodiment of switch device; and Figure 11 is a diagrammatic view of circuits and apparatus illustrating the present pressure-responsive device as a leak detector.

Figure 1:
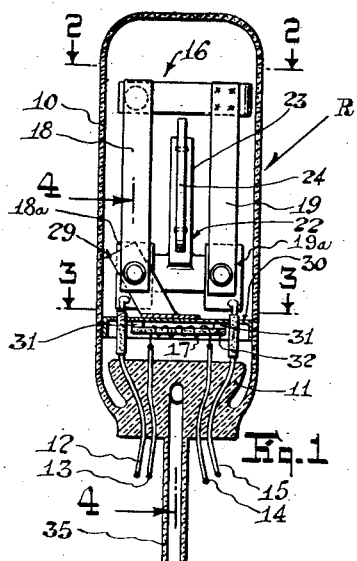
Figure 2:
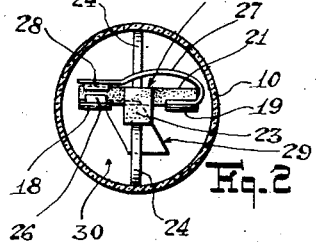
Figure 3:
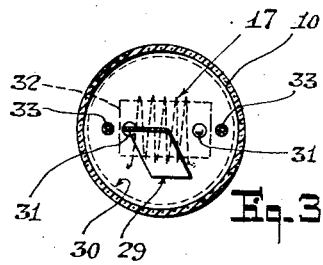
Figure 4:
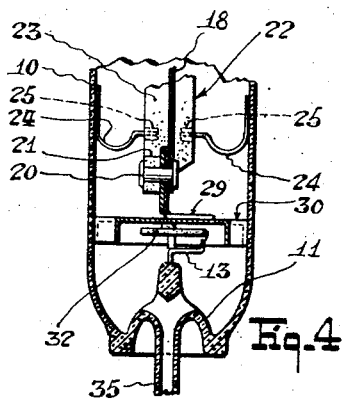

The thermal relay shown in Figures 1 through 4, and referred to as R, comprises a gas-tight casing 10 in the form of a glass bulb having a base provided with an inwardly-projecting stem 11. In the press of the stem there are sealed four lead wires 12, 13, 14 and 15. The two outer lead wires 12 and 15 are connected to a thermally-responsive switch generally referred to as 16 and the two inner lead wires 13 and 14 are connected to a heater winding 17 for operating this switch.

The thermal switch 16 comprises a pair of bimetal strips 18 and 19 mounted parallel to a plane through the axis of the casing. The lower ends of these bimetal strips are connected by rivets 20 to lugs 18a and 19a. These lugs are in turn connected as by welding to the leads 12 and 15 respectively, the two leads 12 and 15 serving to support the switch 16 vertically within the casing. Also, the lugs 18a and 19a are secured by rivets 20 to the cross arm 21 of an inverted T-shaped ceramic frame 22. The central leg 23 of this frame lies midway between the bimetallic strips and is held yieldably in place by two U-springs 24 which are interposed compressibly between the opposite sides of the central leg of the frame and the two opposite walls of the casing, the ends of these springs being located in respective holes 25 provided in the central leg.

Mounted on the upper end of the bimetal strip 18 is an electrical contact 26 and mounted on the upper end of the bimetal strip 19 is a leaf spring 27. This leaf spring is folded back on itself and extended laterally so that its free end portion is adjacent to the electrical contact 26. On the free end of this spring there is a cooperating electrical contact 28.

The bimetal strip 18, which is the actuating thermal element of the switch 16, is thermally connected at its lower end by a metal bracket or strip 29 to an inverted cup-shaped metal shield 30 which surrounds the heater winding 17, the shield being supported loosely in the base portion of the casing by the frame 22 through the metal strip 29 just mentioned. In the shield there are two clearance apertures 33 through which pass the wires 12 and 15 leading to the lugs 18a and 19a. Within the shield and depending from the top wall thereof, there are two insulated posts 31. Mounted on these posts is a mica strip 32 about which is wound the heater winding 17. The bottom of the shield may be enclosed, if desired, but generally this is not necessary since a partial enclosure of the heater winding, as shown, is sufficient to cause the shield to capture substantially all of the heat emitted by the heater winding.

The bimetal strip 19, which is also thermally responsive, is an element adapted to compensate the relay for ambient temperature changes. This bimetal strip has the same temperature-deflection characteristics as has the other bimetal strip, and is arranged to deflect in the same direction as the other strip when the two are subjected to a given change in ambient temperature. The strip 19 is however substantially thermally dissociated from the heater winding 17 so as to be responsive only to ambient temperature changes. Only by way of illustration, the electrical contacts are set to be normally open, and are closed as the heater winding 17 is energized.

The heat transfer from the heater winding 17 to the shield 30 is largely by gaseous conduction when the casing is filled with gas at atmospheric pressure, but is principally by radiation when the gas pressure in the bulb is reduced to the range hereinbefore mentioned. In either case—that is, whether the bulb is filled with gas at atmospheric pressure or is nearly evacuated—a close thermal coupling of the heater winding with the shield is obtained. Since the shield is directly thermally connected to the actuating element by the metal strip 29, it follows that a close thermal coupling of the heater winding to the actuating element is obtained irrespective of the pressure of the gaseous medium in the casing.

In addition to the heat-conduction path leading to the actuating bimetal element just described, there is a heat-conduction path leading from this element to the casing, which is a heat-loss path. This path is by way of the gaseous medium in the casing and has a thermal conductivity which remains substantially constant throughout a higher pressure range and which falls sharply with decreasing pressure through a lower pressure range of the order of 25 mm. of mercury to .0001 mm. of mercury, as beforementioned.

In the higher pressure range just mentioned the mean free length of path of the gas molecules is shorter than the effective length of the gaseous path, with the result that the gas medium has a substantially constant thermal conductivity throughout this pressure range. In the lower pressure range, however, the mean free length of path is greater than the effective length of the path, with the result that the gas medium has a rapidly decreasing thermal conductivity with decreasing pressure. A very simplified explanation for the substantially constant thermal conductivity in the higher pressure range is that, while decreasing pressures result in fewer molecules to conduct the heat, these molecules are enabled to travel farther before colliding with other molecules as the pressure is reduced through this range, and have therefore better heat-conducting ability to compensate for the fewer molecules present. In the lower pressure range, however, each molecule travels the length of the gaseous path with the result that the heat conductivity is substantially proportional to the number of molecules present, or to the gaseous pressure which is proportional thereto. Ultimately, if a pressure is reached where the gaseous conductivity is negligible, losses then occur only by radiation. In the present device, however, radiation is kept intentionally low throughout the operating pressure range of the device by keeping the shield encompassing the heater at all times below the point whereat it would be an efficient radiator.

Figure 5:
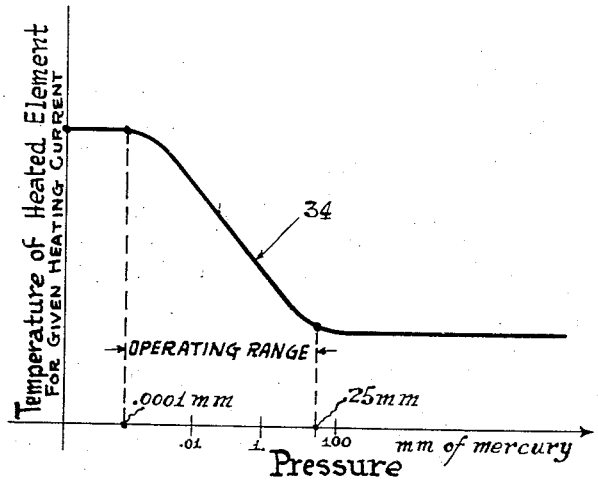
Figure 5 is a graph illustrating the thermal-pressure characteristics of this pressure-responsive switch device.

Because of the influence of the gas pressure on the thermal conductivity of the heat-loss path, as above described, the temperature vs. gas pressure characteristic of the actuating bimetal element, for a given fixed energization of the heater winding, is substantially as shown by a curve 34 of the graph of Figure 5. For instance, in the higher pressure range wherein the thermal conductivity of the heat-loss path is at a higher and substantially constant value, the temperature remains fixed at its lower value; in a next lower pressure range wherein the thermal conductivity falls with decreasing pressure—which is herein termed the "sensitive operating range"—the temperature rises with decrease in the pressure; and in a still lower pressure range wherein the conduction losses are negligible, the temperature remains again fixed but at its higher value. In a typical pressure switch or relay, having a casing of approximately 1⅛" diameter, the threshold pressure, whereat the temperature begins to rise with decreasing pressure, is of the order of 25 mm. of mercury, and the lower threshold pressure at which the temperature again stabilizes is of the order of .0001 mm. of mercury, it being understood though that these are only representative values and that no unnecessary limitation of the invention thereto is intended.

By suitably selecting the energization of the heater winding, the contacts will close as the pressure is reduced to a preselected value, and will open as the pressure is increased above this value. In accordance with my invention, I utilize the present device as a pressure-responsive switch or relay for pressure detecting (including pressure measuring and/or controlling), and to this end the casing 10 is provided with a connecting tube 35 leading through the stem and base thereof, which is for the purpose of connecting the casing to a source of gas pressure to be detected. When operated as a pressure switch, the energization of the heater winding is held fixed, and when the device is operated as a simple thermal relay the pressure is held constant. However, as a special thermal relay which is both current- and pressure-sensitive, both the energizing current and the gaseous pressure are varied, with the result that contact operation occurs as a joint function of these two variables. In the present illustrative example, this operation is such that the contacts close at a higher energizing current as the pressure is increased through the sensitive operating range, and close at a lower energizing current as the pressure is decreased through this range. In other words, increased heating and decreased pressure have additive influence towards effecting contact closure, and decreased heating and increased pressure have the reverse influence.

Figure 6:
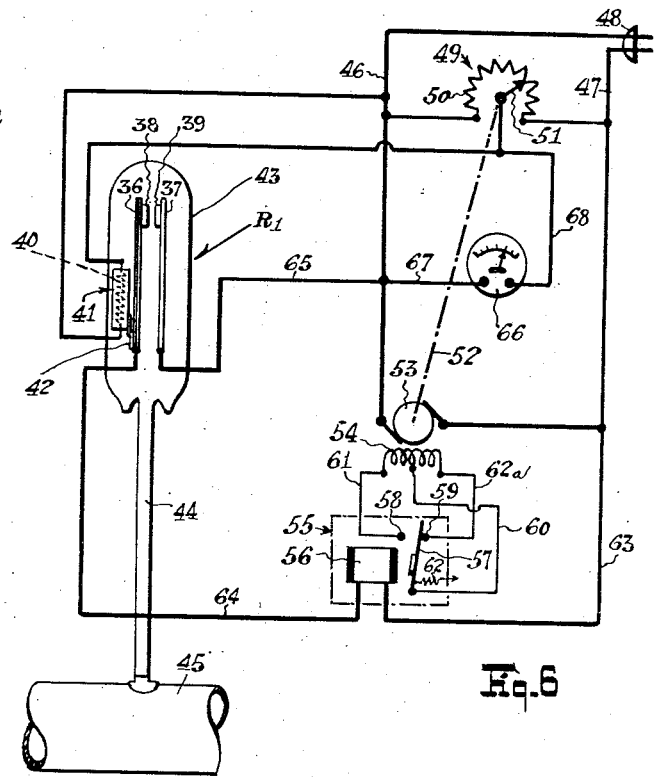
Figure 6 is a diagrammatic view of a pressure-measuring system including the aforestated pressure-responsive switch device according to my invention.

In Figure 6 there is shown a pressure-measuring system wherein a simplified relay $R_1$ of the general form above described is utilized as both a current- and pressure-responsive device. This relay $R_1$, largely diagrammatically shown, comprises an actuating bimetal 36 and adjacent compensating bimetal 37 carrying normally-open electrical contacts 38 and 39 respectively. A heater 40 is housed in a metal shield 41 which is supported on a metal bracket 42 that is connected to the base of the actuating bimetal. The casing 43 has an extending tubular stem 44 connected to a tube 45 which leads to a source of gas pressure to be measured.

This measuring system is supplied with power through leads 46 and 47 connected by way of a plug 48 to a source of power not shown. Connected across the power leads is a voltage divider or rheostat 49 comprising a resistor 50 and a movable contact arm 51. Connected across one section of this voltage divider, as from the lead 46 to the arm 51, is the heater winding 40.

The movable arm 51 of the voltage divider has a drive connection 52, diagrammatically shown, to a motor 53 connected across the power leads. This motor is of a reversible type having a split winding 54 which is selectively energizable to cause the motor to rotate in one direction when one section of the winding is shorted and in a reverse direction when the other section is shorted. For selectively shorting these winding sections, to determine the direction of rotation of the motor, there is provided a single-pole double-throw electromagnetic relay 55 which comprises an electromagnet 56, a switch armature and pole 57 and cooperating contacts 58 and 59. The pole 57 is connected by a lead 60 to the center tap of the split winding and the ends of this winding are connected by leads 61 and 62a to the contacts 58 and 59 respectively. The armature pole is biased outwardly into engagement with the contact 59, as by a spring 62, to cause the motor normally to drive the contact arm 51 of the voltage divider in a clockwise direction, which is in a direction to increase the current energization of the heater winding. The electromagnetic relay is connected across the power leads by way of the electric contacts 38 and 39 of the pressure-responsive relay $R_1$, the connections being made by way of leads 63, 64 and 65.

A voltmeter 66 is connected by leads 67 and 68 across the heater winding 40. This voltmeter responds according to the degree of current energization of the heater winding, and is calibrated in terms of the gas pressure under measurement.

The operation of this measuring system is as follows: If the pressure under measurement is increased from a lower value to the upper end of the operating range shown in Figure 5, the heat loss from the actuating bimetal is increased, the temperature of this element is reduced and the contacts 38 and 39 are maintained open, as shown in the drawing. Under this condition the electromagnetic relay 55 occupies the position shown and the motor drives the voltage divider 51 in a clockwise direction to increase the current energization of the heater winding. When the heater voltage reaches the critical value at which the contacts 38 and 39 are closed, the electromagnet 56 is operated, to close the pole 57 with the contact 58, and the motor is reversed to turn the voltage divider arm 51 counterclockwise, which is in a direction to reduce the heater voltage. If the pressure has not changed, this reverse operation continues until the heater voltage is reduced below the same critical value to cause the contacts to open. So long as the pressure remains constant, the heater voltage will cycle above and below this critical value as a mean. The voltmeter 66 responds to these voltage fluctuations, and the mean of the voltmeter indications is an accurate reading, on a calibrated scale, of the pressure being measured. If the pressure under measurement falls, the heat loss from the actuating element is reduced and for a given energization of the heater winding the temperature of the actuating element rises to maintain the contacts closed until the motor has turned the arm 51 sufficiently counterclockwise to reduce the heater voltage to a lower critical value at which the contacts 38 and 39 will open. So long as the pressure remains at this lower value, the heater voltage will cycle above and below this lower critical voltage, and the voltmeter will fluctuate above and below a lower mean value corresponding to this lower pressure. Thus, whenever the voltmeter indications fluctuate above and below a mean value, that mean value as read on the scale is an accurate measurement of the existing pressure under measurement.

The second embodiment of pressure- and current-responsive switch device or relay according to my invention, shown in Figures 7 and 8 and referred to generally as $R_2$, has the same glass casing 10 and connecting tube 35 as has my first embodiment above described. Leading through the stem of this glass casing are the lead wires 12 to 15 inclusive, the two outer lead wires 12 and 15 serving to support the relay apparatus vertically within the casing, the same as in the first embodiment. Likewise, this relay apparatus includes the same inverted T-shaped ceramic frame 22, the central leg of which is held yieldably in place by interposing two U-springs 24 between it and the opposite wall portions of the casing.

Mounted on one end of the cross arm 21 of the ceramic frame 22 is an upstanding metal bracket 70 which is U-shaped in cross section. This bracket is slotted at the bottom to receive the cross arm 21 between the two sides thereof, and is secured to the arm 21 by a rivet 71. These two sides depend below the cross arm 21 to form lugs 72. To one of these lugs the lead wire 12 is secured as by welding (Figure 8). Secured as by welding to the upper portion of this bracket 70 is a spring hinge 73 the free end portion of which is bent over and away from the bracket to lie in a horizontal plane. Secured as by welding to the free end of this spring hinge is a leaf spring 74. This leaf spring depends downwardly along the side of the central leg of the ceramic frame 22 opposite the bracket 70 and has a movable contact 75 mounted on its lower end portion. This movable contact cooperates with a stationary contact 76 that is mounted on a bracket 77 which is similar to the bracket 71 but has a lesser height. The bracket 77 embraces the other end portion of the cross arm 21 of the ceramic frame 22 and is secured thereto by a rivet 78. Also, this bracket 77 depends below the cross arm to form a lug 77a that is secured as by soldering to the lead wire 15.

Preferably, the two contacts 75 and 76 are operated with a snap movement. This may be accomplished, for example, by mounting a ring magnet 79 around the stationary contact 76 (Figure 9) and by mounting a cooperating ring armature 80 of soft iron around the movable contact 75, the armature being however set back from the end face of the associated contact so that the magnet and armature do not touch when the contacts are closed. With this arrangement the leaf spring 74 yields to the magnetic attraction between the magnet 79 and armature 80, whenever the contacts come within a predetermined distance from each other, to cause the contacts to engage with a snap action. Likewise, on bending the spring hinge 73 in a direction to separate the contacts, they will break with a snap movement whenever the leaf spring has been flexed sufficiently to overcome the magnetic holding force exerted on the contacts.

By way of illustration, the spring hinge 73 is biased so that it overcomes the magnetic holding force on the contacts to tend normally to hold the contacts open. However, the spring hinge is held normally constrained in a counterclockwise direction, as it appears in Figure 7, by a thermally-expansible wire 81. This wire is anchored at its ends onto adjustable anchor members 82 carried in the end portions of a ceramic sleeve 83 that passes through apertures in the lugs 72 of the bracket 70. At the top the wire is looped over a glass bead 84 mounted on the free end of a rod 85 that is secured as by welding to the free end portion of the spring hinge 73. The wire is stretched in a taut condition to hold the contacts 75 and 76 closed against the biasing force of the spring hinge. The ends of the wire are connected by leads 86 to the lead wires 13 and 14. When electric current is passed through the wire to heat it to a suitable temperature, it expands to relieve the constraint on the spring hinge, whereupon the latter opens the contacts in response to its natural biasing. Conversely, when the wire 81 is cooled, it contracts to flex the spring hinge in a counterclockwise direction and to close the contacts.

In this second embodiment there is a heat-loss path leading from the wire, along the length thereof, through the gas medium in the casing 10 to the wall of the casing. As in my first embodiment, the conductivity of this heat-loss path varies sharply with the gaseous pressure in the pressure range wherein the mean free length of path of the gas molecules is of the order of the distance between the wire and the casing. Accordingly, in this range the temperature of the wire varies sharply with changes in the gas pressure even though the heating current in the wire is fixed, the direction of variation being to higher temperatures as the pressure is reduced, and vice versa. Because the temperature rises as the pressure is reduced, less heating current is required at low pressures to close the contacts than is required at high pressures. A plot of heating current vs. pressure to effect contact closure is shown by the curve in Figure 10. This is a curve which is typical of the second embodiment of my invention herein described. While the curve is representative of all pressure-responsive switch devices of the character herein described, it will be understood that the curve will be displaced along one or another of the axes, and may vary somewhat in shape, should the dimensions of the device be changed substantially. Since the heating current to effect contact closure is easily measured, and since it is representative of the gaseous pressure of any source to which the tube leading from the casing 10 may be connected, it will be understood that the pressure of that source is easily measured in terms of the heating current by suitable calibration of the device. Likewise, it will be understood that this second embodiment may be adapted for use in the automatic pressure-measuring system shown in Figure 6.

From the foregoing description of this second embodiment of pressure-responsive device, it is seen that the wire 81 is stretched between anchor points carried by the frame 70. In order that the spacing between these anchor points will vary with changes in ambient temperature to the same extent as the length of the wire is varied by changes in ambient temperature, the frame 70 is made of an alloy having substantially the same coefficient of expansion as that of the wire. Thus, the present device is compensated for changes in ambient temperature.

In Figure 11 the pressure-responsive device of the present invention is illustrated as a leak detector. Herein, the pressure-responsive device is shown diagrammatically as comprising the casing 10, a heater 91, and a pair of thermally-responsive switch contacts 92. The casing 10 is connected by a tube 93 to a conduit 94 which may be part of a vacuum system and which is to be detected for gas leaks. The contacts 92 are connected through a lamp 95, or other suitable signaling or control apparatus, to a line 96 which may be a 110-volt 60-cycle lighting circuit. This lighting circuit is connected also through a step-down transformer 97 across a potentiometer 98. The heater 91 is connected by leads 99 between a variable contact 100 and one end 101 of this potentiometer, the potentiometer serving thus as a means to preset the heating current in the heater 91 and to establish therefor a preselected threshold pressure in the casing 10 at which the contacts are operated. Below this threshold pressure, the contacts 92 will be open and at pressures above this threshold they will be closed. Thus, the lamp 95 will light should a leak develop in the conduit 94 to cause the pressure therein to rise above the preselected threshold value. As here shown in Figure 11, leak detection is accomplished by very simple apparatus, and with a high degree of dependability, with the use of a pressure-responsive device according to the present invention.

I have herein shown and described several novel forms of current- and pressure-responsive electrical switches or relays for carrying out my novel method of low-pressure detection, and have also shown and described a novel measuring system and detecting apparatus incorporating such a relay, wherein the peculiar properties of the relay are utilized in a novel manner to accomplish novel and advantageous results. These particular illustrations of my novel current- and pressure-responsive devices, as herein shown, are however intended only as illustrative, since this novel device obviously has many other applications and uses.

The embodiments of my invention herein shown are intended to be illustrative and not limitative of my invention, for the reasons herein expressed, and for the reasons that the same are obviously subject to changes and modifications without departure from the scope of my invention, which I endeavor to express according to the following claims.

I claim:

1. A pressure-measuring system comprising an air-tight device adapted to be connected to a source of gaseous pressure to be measured and including a pair of cooperable electrical contacts, electrically-energizable heating means, and thermally responsive contact-operating means in said device thermally coupled to said heating means and having a heat loss path through the gas medium in said device characterized as having a thermal conductivity which decreases sharply with decrease of said pressure through a predetermined lower pressure range to cause an increase in response of said contact-operating means for a given energization of said heating means; variable circuit means adapted when operated to vary the energization of said heating means; a reversible motor controlled by said contacts and adapted to operate said circuit means to increase the energization of said heating means when the motor operates in one direction but to decrease the energization of said heating means when said motor operates in the other direction; and an electrical instrument connected to said heating means and adapted to respond in proportion to the energization of the heating means.

2. The system set forth in claim 1 wherein said electrical instrument is a voltmeter calibrated in terms of the pressure under measurement.

3. A pressure-measuring system comprising an air-tight device adapted to be connected to a source of gaseous pressure to be measured and including a pair of cooperable electrical contacts, electrically-energizable heating means, and thermal responsive contact-operating means thermally coupled to said heating means and having a heat loss path to the outside ambient through the gas medium in said device, said heat loss path having a thermal conductivity which decreases sharply with decrease of said pressure through a predetermined lower pressure range to cause said contact-operating means to close said contacts when the energization of said heating means is increased and when said gaseous pressure is decreased, and to open said contacts when said energization is decreased and said pressure is increased; circuit means adapted when operated to vary the energization of said heating means; a reversible motor adapted to operate said circuit means to increase the energization of said heating means when the motor operates in one direction, but to decrease the energization of said heating means when said motor operates in the other direction; means controlled by said contacts to operate said motor in a direction to increase said energization when said contacts are open, and vice versa; and an electrical instrument connected to said heating means adapted to respond in proportion to the energization of the heating means and calibrated in terms of the pressure of said gaseous medium.

4. A pressure-measuring system comprising an air-tight casing adapted to be connected to a source of gaseous pressure to be measured and including a pair of cooperable electrical contacts, an electrically-energizable heater, a thermally-responsive contact-operating means having close thermal coupling with said heater and having a heat-loss coupling with the outside ambient at least in part by way of the gas medium in said device, said heat-loss coupling being characterized as having a thermal conductivity which increases sharply with increase of said pressure through a predetermined lower pressure range to cause a decrease in response of said contact-operating means, for a given energization of said heater, tending to open said contacts; a variable voltage divider for controlling the energization of said heater; a reversible motor having a drive connection to said divider and controlled by said contacts to cause an increase in the energization of said heater tending to close said contacts as said pressure rises within said range and to cause a decrease in the energization of said heater tending to open said contacts as said pressure falls within said range; and an instrument connected to said heater and responsive according to the degree of energization thereof, said instrument being calibrated in terms of the gaseous pressure under measurement.

5. A pressure-responsive system comprising an air-tight device adapted to be connected to a variable source of pressure and including a pair of cooperable electrical contacts, electrically-energizable heating means in said device, and thermally responsive contact-operating means in said device thermally coupled to said heating means and having a heat loss path through the gas medium in said device characterized as having a thermal conductivity which varies sharply with change of said pressure through a predetermined lower pressure range to cause an increase in response of said contact-operating means when said pressure falls and the energization of said heating means is increased and to cause a decrease in response to said contact-operating means when said pressure rises and the energization of said heating means is decreased; a variable voltage divider for controlling said energizable means; and a reversible motor controlled by said contacts for operating said divider in one direction or the other according to whether said contacts are open or closed.

6. A system responsive to pressure in a predetermined lower range comprising an hermetically-sealed device adapted to be connected to a variable source of gaseous pressure and including a pair of normally-open electrical contacts, electrically energizable heating means, and a thermally-responsive means operable by said heating means to close said contacts, said last-stated means having a heat-loss path to the outside ambient a portion of which is through the gas medium in said device and is of the order of length of the mean free length of path of the gas molecules of said gas medium at pressures thereof within said predetermined range to cause said thermally-responsive means to respond to greater and lesser degree, for a given energization of said heating means, respectively as said pressure falls and rises; a variable voltage divider for controlling the energization of said heating means; and a reversible motor controlled by said contacts for operating said divider to increase the energization of said heating means when said contacts are open and to decrease the energization of said heating means when said contacts are closed.

References Cited in the file of this patent

UNITED STATES PATENTS

| Number | Name | Date |
|---|---|---|
| 915,974 | Leonard | Mar. 23, 1909 |
| 1,581,714 | Appelberg | Apr. 20, 1926 |
| 1,833,233 | Sieber | Nov. 24, 1931 |
| 2,511,752 | Tandler et al. | June 13, 1950 |
| 2,652,727 | Richardson et al. | Sept. 22, 1953 |

FOREIGN PATENTS

| Number | Country | Date |
|---|---|---|
| 295,259 | Germany | Nov. 14, 1916 |
| 131,844 | Switzerland | May 16, 1929 |

OTHER REFERENCES

Klumb et al. (article) pages 27–32, Physikalische Zeitschrift, Jg. 37, #1, 1936.

Penning (article) "High vacuum gauges," pages 201–208 Phillips Technical Review, vol. 2, July 1937.